United States Patent [19]
Binford et al.

[11] Patent Number: 5,533,190
[45] Date of Patent: Jul. 2, 1996

[54] METHOD FOR MAINTAINING PARITY-DATA CONSISTENCY IN A DISK ARRAY

[75] Inventors: Charles D. Binford, Wichita, Kans.; Mark A. Gaertner, Woodbury, Minn.; Steven P. Denny, El Dorado, Kans.

[73] Assignees: AT&T Global Information Solutions Company, Dayton, Ohio; Hyundai Electronics America, Milpitas, Calif.; Symbios Logic Inc., Fort Collins, Colo.

[21] Appl. No.: 360,198

[22] Filed: Dec. 21, 1994

[51] Int. Cl.$^6$ .................................................. G06F 11/00
[52] U.S. Cl. ........................... 395/182.04; 395/182.18
[58] Field of Search .................. 395/182.03, 182.04, 395/182.05, 400, 425, 182.18, 182.13, 182.15; 371/40.1

[56] References Cited

U.S. PATENT DOCUMENTS

| | | | |
|---|---|---|---|
| 5,375,128 | 12/1994 | Menon et al. | 371/40.1 |
| 5,379,417 | 1/1995 | Lui et al. | 395/575 |
| 5,418,921 | 5/1995 | Cortney et al. | 395/425 |

*Primary Examiner*—Hoa T. Nguyen
*Assistant Examiner*—Ly V. Hua
*Attorney, Agent, or Firm*—Wayne P. Bailey; James M. Stover

[57] ABSTRACT

A method for assuring consistency between data and parity in a disk array system following a reset or a power failure condition which interrupts the execution of write I/O operations. The method includes the steps of: examining drive activities to identify unfinished write I/O operations due to an interrupt condition; logging information necessary to identify the unfinished operations and the array redundancy groups associated with the unfinished operations into a non-volatile memory; and checking for log entries in the non-volatile memory during a disk array subsystem initialization or the restoration of power. For each unfinished operation identified in the log, the method further includes the steps of: performing a bit-wise exclusive-OR of corresponding portions of the data stored within the associated redundancy group to calculate parity consistent therewith; and writing the calculated parity to the parity storage areas within the associated redundancy group. For an array operating with a failed disk drive member (i.e., in degraded mode), the method also logs information necessary to identify the storage areas to which the unfinished write I/O operations map new data and parity, and some form of the old data and parity information saved to that storage areas to which the unfinished write I/O operations map new data and parity. Following the system reset, or restoration of power, consistent parity is determined for each associated redundancy group.

14 Claims, 7 Drawing Sheets

METHOD FOR MAINTAINING PARITY-DATA CONSISTENCY IN A DISK ARRAY

The present invention relates to disk array storage devices for computer systems and, more particularly, to a method for safeguarding disk array write operations.

BACKGROUND OF THE INVENTION

Disk arrays comprising a multiplicity of small inexpensive disk drives, such as the 5¼ or 3½ inch disk drives currently used in personal computers and workstations, connected in parallel have emerged as a low cost alternative to the use of single large disks for non-volatile storage of information within a computer system. The disk array appears as a single large fast disk to the host system but offers improvements in performance, reliability, power consumption and scalability over a single large magnetic disk. In addition to data, redundancy information is stored within the array so that if any single disk within the array should fail, the disk array continues to function without the loss of data.

Several disk array alternatives are discussed in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks. Five disk array arrangements, referred to as RAID levels, are described. The simplest array, a RAID level 1 system, comprises one or more disks for storing data and an equal number of additional "mirror" disks for storing copies of the information written to the data disks. The remaining RAID levels, identified as RAID level 2, 3, 4 and 5 systems, segment the data into portions for storage across several data disks. One or more additional disks are utilized to store error check or parity information.

RAID level 2 and 3 disk arrays are known as parallel access arrays. Parallel access arrays require that all member disks (data and parity disks) be accessed, and in particular, written, concurrently to execute an I/O request. RAID level 4 and 5 disk arrays are known as independent access arrays. Independent access arrays do not require that all member disks be accessed concurrently in the execution of a single I/O request. Operations on member disks are carefully ordered and placed into queues for the member drives. The present invention is directed to improvements in the operation of RAID level 4 and 5 systems.

A RAID level 4 disk array is comprised of N+1 disks wherein N disks are used to store data, and the additional disk is utilized to store parity information. Data to be saved is divided into portions consisting of one or many blocks of data for storage among the disks. The corresponding parity information, which can be calculated by performing a bit-wise exclusive-OR of corresponding portions of the data stored across the N data drives, is written to the dedicated parity disk. These corresponding portions of data together with the parity associated therewith are referred to as redundancy groups. The parity disk is used to reconstruct information in the event of a disk failure. Writes typically require access to two disks, i.e., one of the N data disks and the parity disk, as will be discussed in greater detail below. Read operations typically need only access a single one of the N data disks, unless the data to be read exceeds the block length stored on each disk.

RAID level 5 disk arrays are similar to RAID level 4 systems except that parity information, in addition to the data, is distributed across the N+1 disks in each group. Each one of the N+1 disks within the array includes some blocks for storing data and some blocks for storing parity information. Where parity information is stored is controlled by an algorithm implemented by the user. As in RAID level 4 systems, RAID level 5 writes typically require access to two disks; however, no longer does every write to the array require access to the same dedicated parity disk, as in RAID level 4 systems. This feature provides the opportunity to perform concurrent write operations.

A RAID level 5 system including five data and parity disk drives, identified as DRIVE A through DRIVE E, is illustrated in FIG. 1. An array controller 100 coordinates the transfer of data between the host system 200 and the array disk drives. The controller also calculates and checks parity information. Blocks 101 through 105 illustrate the manner in which data and parity is stored on the five array drives. Data blocks are identified as BLOCK 0 through BLOCK 15. Parity blocks are identified as PARITY 0 through PARITY 3. The relationship between the parity and data block is as follows:

PARITY 0 =(BLOCK 0) XOR (BLOCK 1) XOR (BLOCK 2) XOR (BLOCK 3)
PARITY 1 =(BLOCK 4) XOR (BLOCK 5) XOR (BLOCK 6) XOR (BLOCK 7)
PARITY 2 =(BLOCK 8) XOR (BLOCK 9) XOR (BLOCK 10) XOR (BLOCK 11)
PARITY 3 =(BLOCK 12) XOR (BLOCK 13) XOR (BLOCK 14) XOR (BLOCK 15)

As stated above, parity data can be calculated by performing a bitwise exclusive-OR of corresponding portions of the data stored across the N data drives. However, because each parity bit is simply the exclusive-OR product of all the corresponding data bits from the data drives, new parity can be more easily determined from the old data and the old parity as well as the new data in accordance with the following equation:

$$\text{new parity} = (\text{old data XOR old parity}) \text{ XOR new data.}$$

The read-modify-write method is advantageous in that only the data and parity drives which will be updated need to be accessed during the write operation; whereas all the drives in the array will have to be read or accessed to perform a bit-wise exclusive-OR of corresponding portions of the data stored across the data drives in order to update parity information. A disadvantage of the read-modify-write operation is that a typical RAID level 4 or 5 write operation will require a minimum of two disk reads followed by two disk writes.

Drive utilization efficiency may be improved by modifying the read-modify-write process, separating the execution of data read and write operations from the execution of parity read, generation and write operations. This modified read-modify-write operation identifies the disk drives containing the data and parity to be updated and places the proper read and write requests into the I/O queues for the identified data and parity drives, scheduling some or all parity operations; i.e. reading old parity information from the parity drive, generating new parity information and writing the new parity information to the parity drive; for execution when best accommodated in the I/O queue for the parity drive, following the read of old data from the data drive.

In both the read-modify-write procedure or the modified read-modify-write procedure discussed above, actual write transfers of new data and parity need not occur at the same time. If either the new data or new parity is written prior to a system failure, but the other is not, the contents of the redundancy group will be inconsistent after the system restarts, i.e., the parity information will not be in agreement with the data stored within the redundancy group. A retry of the write operation interrupted during the system failure will not correct the inconsistencies in the redundancy group.

A method and structure for safeguarding disk array write operations is required to prevent the data loss resulting from the occurrence of a power failure or array failure prior to completion of all write procedures.

OBJECTS OF THE INVENTION

It is therefore an object of the present invention to provide a new and useful method for restoring consistency between parity and data within a disk array following an interruption in write I/O operations.

It is another object of the present invention to provide such a method for restoring consistency between parity and data within an independent access disk array, such as a RAID level 4 or 5 disk array, employing a read-modify-write process for updating data and parity.

It is yet another object of the present invention to provide a new and useful method for restoring consistency between parity and data within a disk array operating in a degraded mode wherein one of the drives within the array has failed.

SUMMARY OF THE INVENTION

There is provided, in accordance with the present invention, a method for restoring consistency between data and parity stored within redundancy groups in an independent access disk array system following a system reset or a power failure condition which interrupts the execution of one or more disk write I/O operations. The method includes the steps of: examining current drive activities to identify unfinished write I/O operations in response to the receipt of a reset signal from a host system or a low power warning signal from an uninterruptable power supply (UPS); logging information necessary to identify the unfinished write I/O operations and the redundancy groups associated with the unfinished write I/O operations into a non-volatile memory; checking for log entries in the non-volatile memory during a disk array subsystem initialization following the system reset or the, restoration of power following a power failure; for each one of the unfinished write I/O operations identified in the log, performing a bitwise exclusive-OR of corresponding portions of the data stored within the redundancy group associated with the unfinished write I/O operations to calculate parity consistent therewith; and writing the calculated parity to the parity storage areas within the redundancy group associated with the unfinished write I/O operation.

In an alternately described embodiment, particularly applicable to an independent access disk array operating in a degraded mode, i.e., operating with a failed disk drive, the method also logs information necessary to identify the data and parity data storage areas to which the unfinished write I/O operations map new data and parity, and some form of the old data and parity information saved at those data and parity data storage areas. Following the system reset, or restoration of power, consistent parity is determined for each redundancy group associated with an unfinished write I/O operation by combining the old data and parity saved to the non-volatile memory with the data currently stored within the data storage area to which the unfinished write I/O operation maps new data.

The above and other objects, features, and advantages of the present invention will become apparent from the following description and the attached drawings.

DETAILED DESCRIPTION OF THE PREFERRED EMBODIMENT

Normal Array Operation

Figure 1:
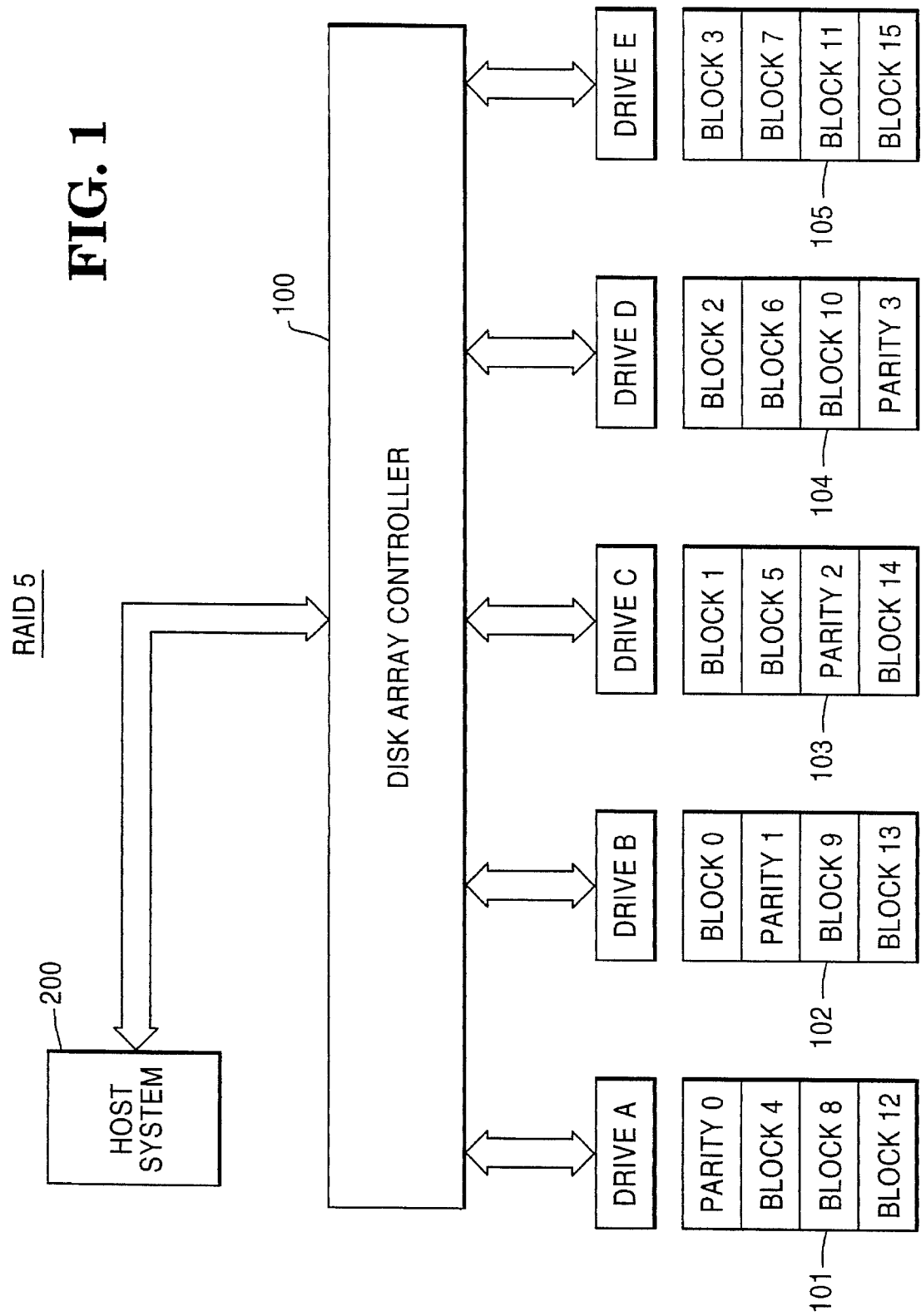
FIG. 1 is a block diagram representation of a RAID level 5 array including five disk drives.
Figure 2:
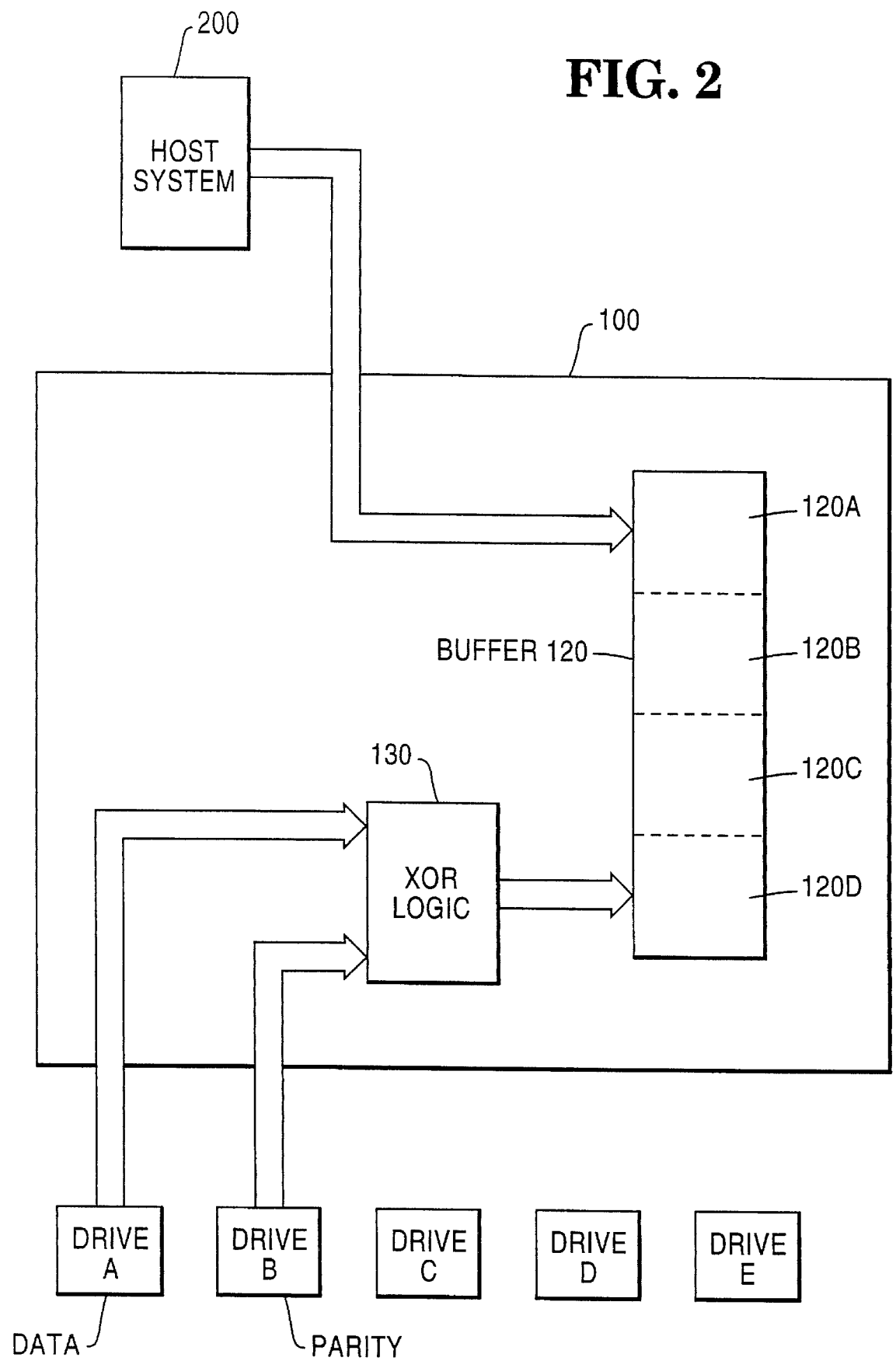
FIGS. 2 and 3 illustrate a traditional RAID level 5 read-modify-write operation.
Figure 3:
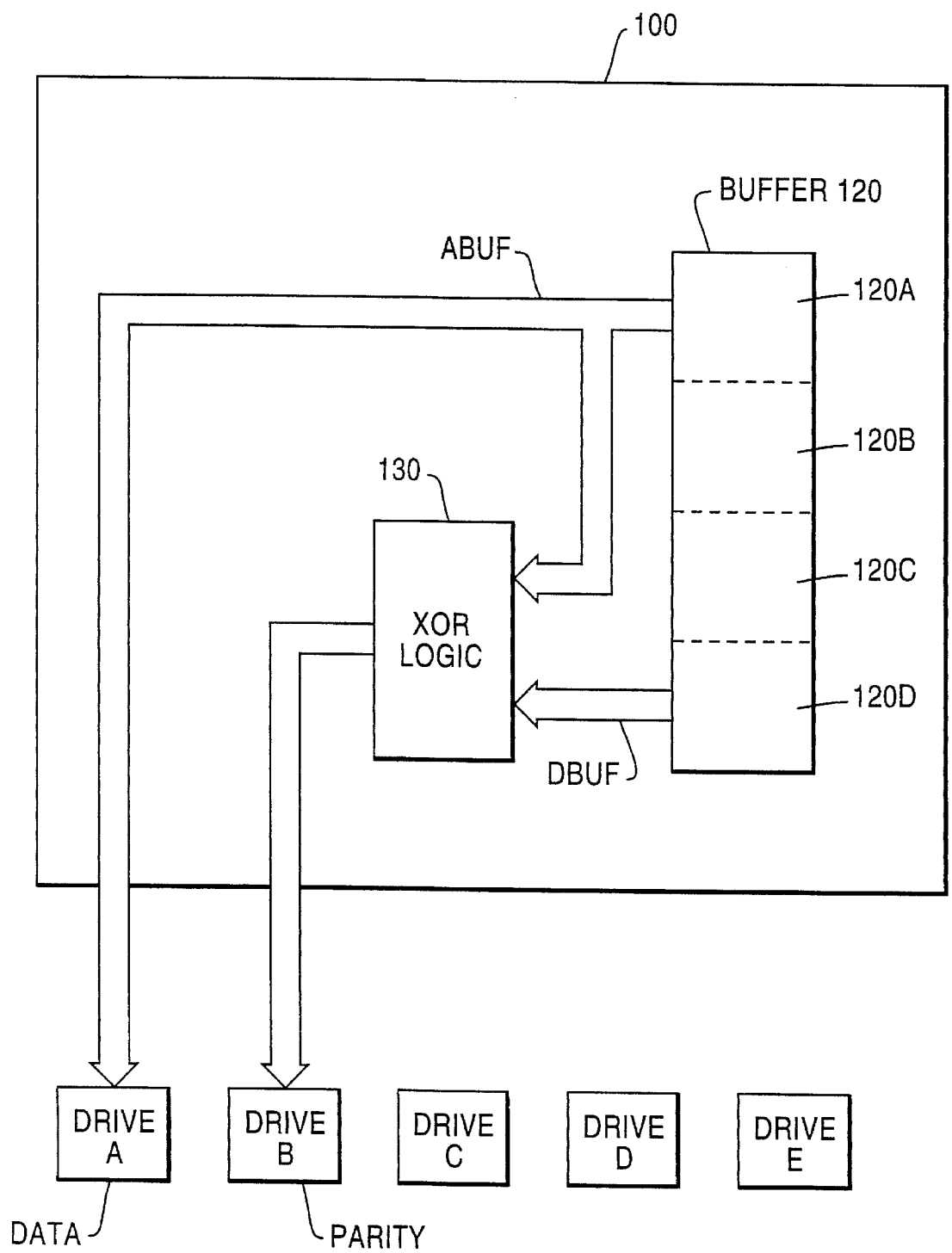

FIGS. 2 and 3 illustrate a RAID level 5 write involving DRIVE A and DRIVE B, wherein new data is to be written to DRIVE A and parity information is to be updated on DRIVE B. Structures included within controller 100 to facilitate the read-modify-write operation includes transfer buffer 120 and exclusive-OR (XOR) logic 130. The present invention relates to a method for assuring parity consistency within a disk array following a system reset or power supply disruption. Details concerning the construction of the controller are not believed necessary for an understanding of the present invention. However, additional detail concerning the structure and operation of one form of a disk array controller in which the present invention may be utilized are provided in U.S. Pat. No. 5,257,391, incorporated herein by reference. U.S. Pat. No. 5,257,391, entitled "Disk Controller having Host Interface and Bus Switches for Selecting Buffer and Drive Busses Respectively Based on Configuration Control Signals," is assigned to NCR Corporation.

Under direction of a controller processor, not shown, old data and parity information are first read from the two drives as shown in FIG. 2. The old data and parity are read from the target areas within drives DRIVE A and DRIVE B, respectively, and routed to exclusive-OR logic 130. Logic 130 combines the received data and parity to generate the exclusive-OR product: old data XOR old parity, referred to herein as intermediate parity. The intermediate parity is stored in a first area 120D within buffer 120. New data received from host system 200 is concurrently saved to a second area 120A within buffer 120.

New data and parity information is then written to DRIVE A and DRIVE B as shown in FIG. 3. The new data is written directly from area 120A in storage buffer 120 to DRIVE A. The new data and intermediate parity are provided to exclusive-OR logic 130 to generate the new parity information. This new parity, old data XOR old parity XOR new data, is written to DRIVE B.

Figure 4:
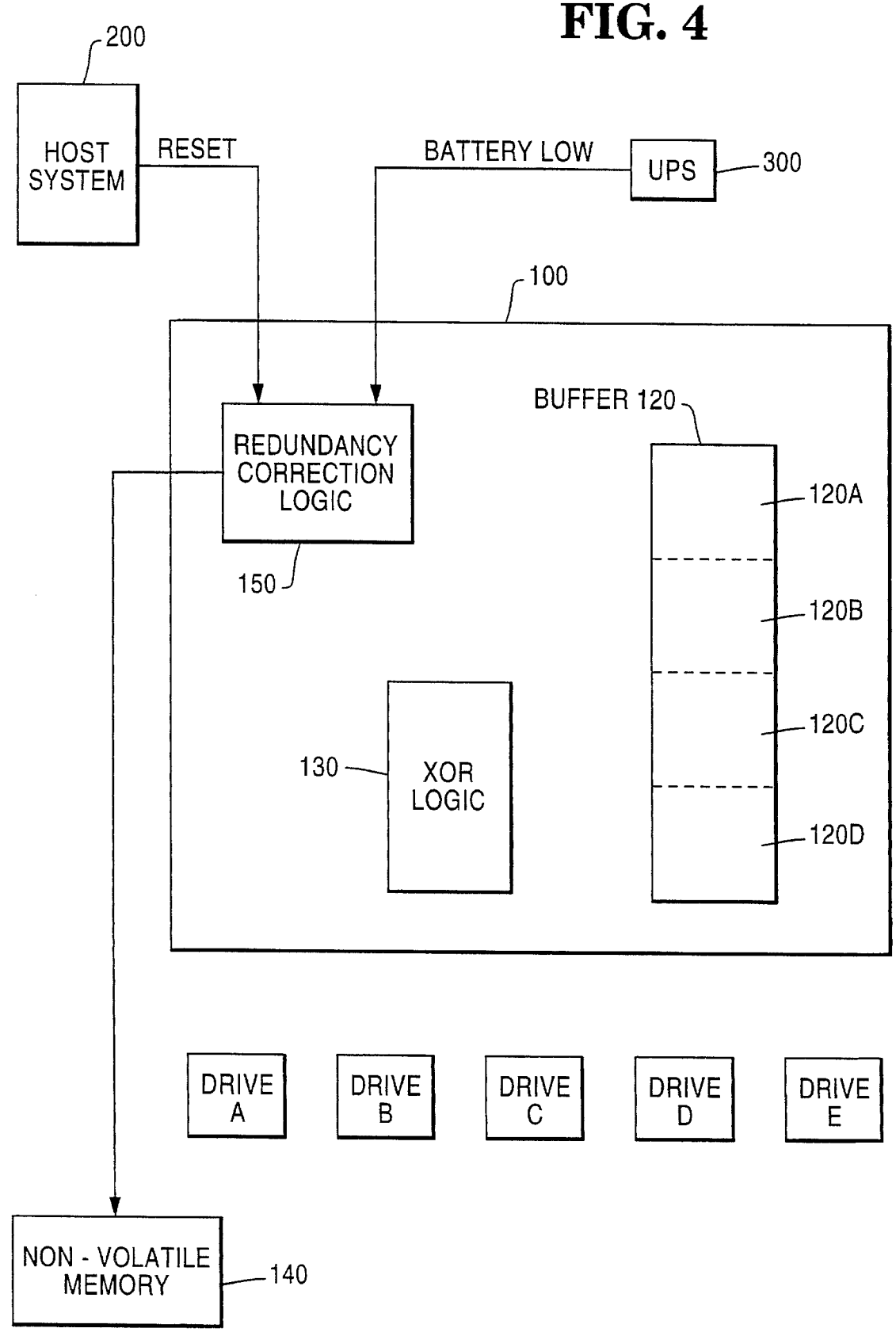
FIG. 4 illustrates the process of logging pending write I/O operations to a non-volatile memory in accordance with the present invention.

In accordance with one embodiment of the present invention, the disk array system further includes a non-volatile memory 140, and additional logic 150 within controller 100, as shown in FIG. 4. Logic 150 is responsive to the receipt of a reset signal from host system 200 or a battery low signal from an uninterruptable power supply (UPS) 300 to examine current drive activities to identify unfinished write I/O operations. The controller, in accordance with logic 150, then logs pertinent information concerning the unfinished write operations into non-volatile memory 140. The information logged into memory 140 for each unfinished write operation, which is necessary to locate potentially affected redundancy groups within the array, may include identification of disk drives, block addresses, and RAID level.

Figure 5:
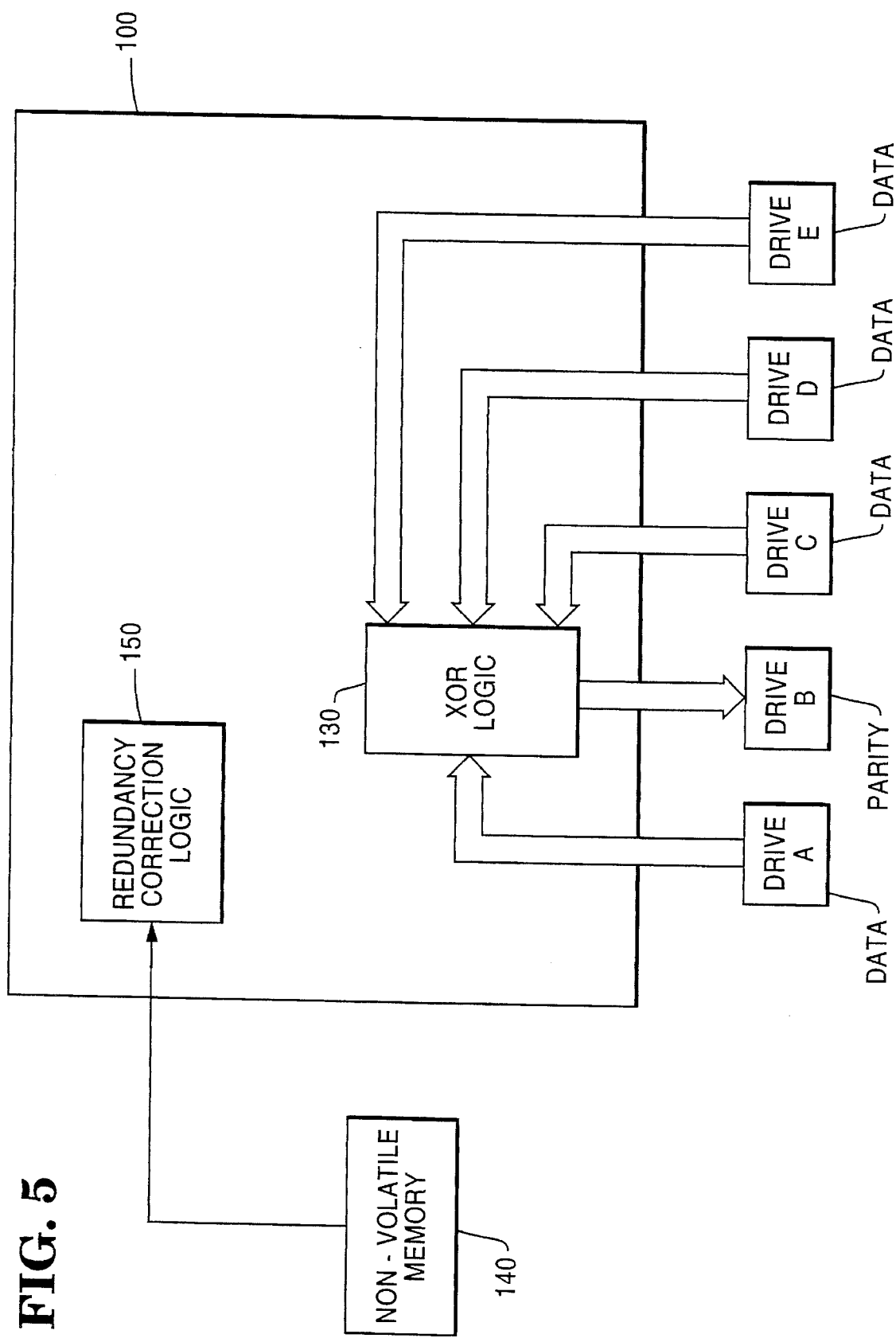
FIG. 5 illustrates the data redundancy correction process following a host system restart in accordance with the present invention.

FIG. 5 illustrates the data redundancy correction, or reconciliation, process following a host system restart. During the disk array subsystem initialization following the reset, or restoration of power following a power failure, the array controller checks for log entries in the non-volatile memory. If entries exist in the log, an array correction process must be performed before allowing any unfinished write operations to be retried or any new write operations to begin. The reconciliation operation for a redundancy group with no failed drives comprises performing a bit-wise exclusive-OR of corresponding portions of the data stored across the data drives within the redundancy group to calculate parity consistent therewith and saving the result to the parity drive, DRIVE B in the array depicted in FIG. 5. In FIG. 5, the data saved to drives DRIVE A, DRIVE C, DRIVE D and DRIVE E is read, combined by XOR logic 130, and saved to DRIVE B.

Although the redundancy correction procedure assures that the parity information is consistent with the data within the redundancy group, the data may not be accurate depending upon status of write operations at the time of the host reset or power failure. Repeating all incomplete write operations following the recalculation of parity information, an operation performed by the host system 200, will correct the data saved to the array drives.

Alternatively, the array controller could first locate and then correct any inconsistencies in the redundant data, but for performance reasons it is usually more expedient to execute the correction operation as described above.

Degraded Mode Array Operation

The reconciliation process described above must be altered if a disk drive in the array redundancy group is unavailable and the array is said to be operating in a reduced or degraded mode. In a degraded mode of operation, if a read operation requests data residing on a surviving disk drive, the data is delivered as if the array were intact and operating in a normal mode. If data is requested from the failed drive, array management software must regenerate the data by reading corresponding blocks from the surviving drive members and computing the exclusive-OR product of their contents.

Write operations within an array operating in a degraded mode vary depending upon the location of data and parity which must be updated during the read-modify-write operation. Three write situations are possible:

Data and parity map to surviving array drives - When data is written to a redundancy group wherein the data blocks and parity blocks to be updated each reside on surviving drives, the read-modify-write routine is executed as if the array were intact.

Parity maps to failed array drive - If the parity blocks requiring updating reside on the failed drive member, new parity is not computed or written. New data received from the host is written to the surviving data drive.

Data maps to failed array drive - When data is to be written to the failed drive member, the new parity is determined by calculating the exclusive-OR product of the new data received from the host and the corresponding data blocks (parity blocks are excluded) from the surviving array drives. The new parity is then written over the old parity. The new data received from the host is not written to the array drives.

Figure 6:
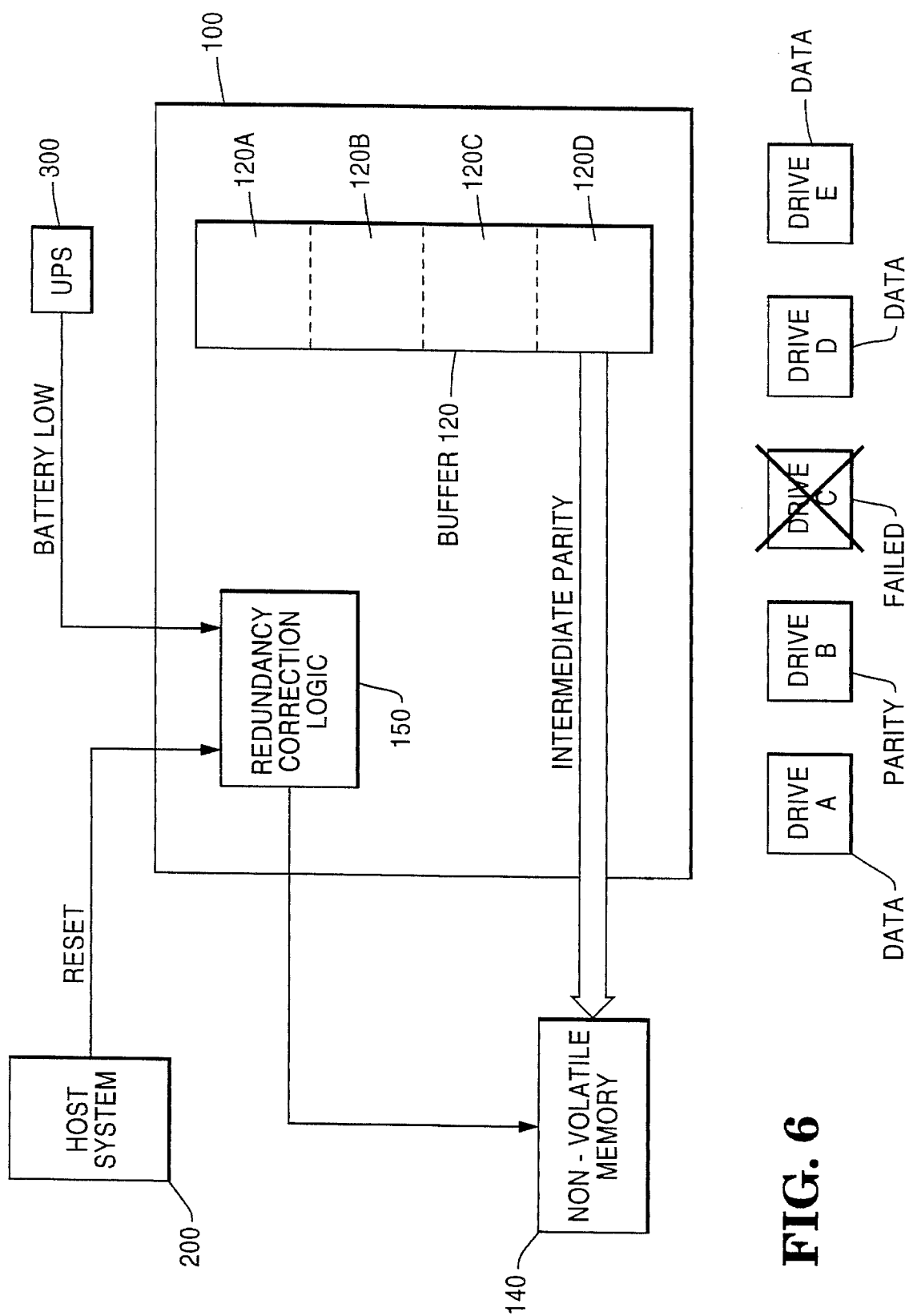
FIG. 6 illustrates the process of logging of pending write I/O operations and intermediate parity for RAID 4 or 5 degraded mode operation in accordance with the present invention.
Figure 7:
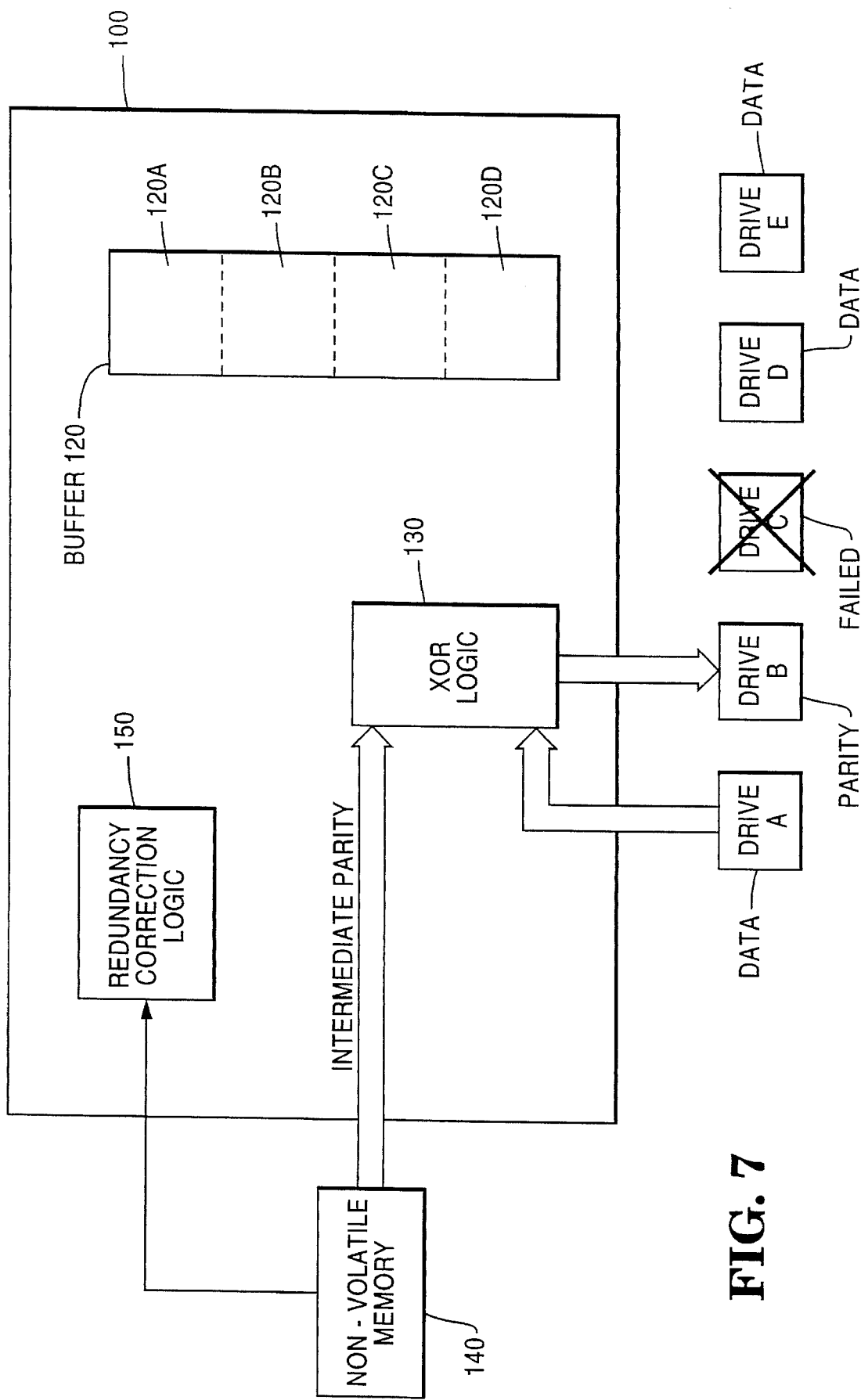
FIG. 7 illustrates the data redundancy correction process for a RAID 4 or 5 operating in a degraded mode following a host system restart in accordance with the present invention.

For interrupted write operations where data and parity map to surviving array drives, the parity reconciliation process is possible for an array operating in a degraded mode only if some form of the original redundant data is also preserved in non-volatile memory along with the interrupted write log information. For an interrupted RAID level 5 write operation the redundant data to be preserved could be the intermediate parity (old data XOR old parity). FIG. 6 illustrates the process of logging pending write I/O operations and intermediate parity for RAID 4 or 5 degraded mode operation in accordance with the present invention. The intermediate parity can be read from volatile memory buffer 120. Kindly refer to FIG. 2 and the discussion concerning FIG. 2 provided above for an explanation of intermediate parity. Parity consistent with the data saved to the redundancy group can be determined by combining the intermediate parity with the current data stored on the media of the interrupted write data drive, as shown in FIG. 7.

For interrupted write operations where parity or data maps to a failed array drive, it is not necessary to sane intermediate parity to non-volatile memory. In summary, the array controller logic for maintaining parity consistency must perform the following operations:

1. Log information about unfinished writes that will allow the array controller to later identify affected areas to non-volatile memory.

2. In a degraded mode array, preserve a copy of some form of the original redundant data necessary to correct the data redundancy in non-volatile memory.

3. Check the log during normal initialization processing.

4. For each entry in the log, correct potential inconsistencies in the redundant data as described above.

Array controller performance can be maintained if entries for unfinished write operations are only made into the log at the point of interruption, thus reducing normal processing overhead. When the array controller receives a reset signal from the host it scans the array data structures to identify current array activity. The controller then makes the required entries concerning unfinished write operations into non-volatile memory before executing reset initialization.

A similar process is executed following the receipt of a low power warning from the UPS. Following a predetermined time interval, the array controller logic executes a routine which prohibits any new read or write requests from being issued to the array drives, scans the array data structures to identify current array activity, and then makes the required entries concerning unfinished write operations into non-volatile memory. Some of the unfinished write operations may successfully complete before actual power failure. As write operations are completed, the log entries associated with those write operations will be removed as they are no longer considered unfinished. Alternatively, to provide protection across a power failure within a system which does not have a low power warning from the UPS, the system maintains entries for all unfinished write operations in non-volatile memory. Again, as write operations are completed, the log entries associated with those write operations will be removed from non-volatile memory.

It can thus be seen that there has been provided by the present invention a new and useful method for restoring consistency between parity and data within a disk array following an interruption in write I/O operations, particularly useful for independent access disk array systems, such as RAID level 4 or 5 disk arrays, employing a read-modify-write process for updating data and parity.

Although the presently preferred embodiment of the invention has been described, it will be understood that various changes may be made within the scope of the appended claims. For example, non-volatile memory 140 can be a PROM, EPROM or EEPROM device, a PCMCIA flash card device, or a magnetic disk drive.

These and other variations, changes, substitutions and equivalents will be readily apparent to those skilled in the art without departing from the spirit and scope of the present invention. Accordingly, it is intended that the invention to be secured by Letters Patent be limited only by the scope of the appended claims.

What is claimed is:

1. In an independent access disk array subsystem, a method for maintaining consistency between the contents of data and parity storage areas within redundancy groups in the array subsystem following a system reset which interrupts the execution of one or more disk write I/O operations, said method comprising the steps of:

examining current drive activities to identify unfinished write I/O operations in response to the receipt of a reset signal;

logging information necessary to identify said unfinished write I/O operations and the redundancy groups associated with said unfinished write I/O operations into a non-volatile memory;

checking for log entries in the non-volatile memory during a disk array subsystem initialization following the system reset;

for each one of said unfinished write I/O operations, performing a bit-wise exclusive-OR of corresponding portions of the data stored across the data storage areas within the redundancy group associated with said one of said unfinished write I/O operations to calculate parity consistent therewith; and writing the calculated parity to said parity storage areas within said redundancy group associated with said one of said unfinished write I/O operations.

2. The method in accordance with claim 1, further comprising the step of:

reexecuting said unfinished write I/O operations.

3. The method in accordance with claim 1, wherein said information necessary to identify redundancy groups associated with said unfinished write I/O operations includes block addresses to which said unfinished I/O operations map data and parity information.

4. In an independent access disk array subsystem, a method for maintaining consistency between the content of data and parity storage areas within redundancy groups following a low power condition which interrupts the execution of one or more disk write I/O operations, said method comprising the steps of:

examining current drive activities to identify unfinished write I/O operations in response to the receipt of a battery low signal from an uninterruptable power supply (UPS);

at the expiration of a predetermined time interval initiated upon receipt of said low power signal, logging information necessary to identify said unfinished write I/O operations and the redundancy groups associated with said unfinished write I/O operations into a non-volatile memory;

checking for log entries in the non-volatile memory during a disk array subsystem initialization following a recovery from said low power condition;

for each one of said unfinished write I/O operations, performing a bit-wise exclusive-OR of corresponding portions of the data stored across the data storage areas within the redundancy group associated with said one of said unfinished write I/O operations to calculate parity consistent therewith; and writing the calculated parity to said parity storage areas within said redundancy group associated with said one of said unfinished write I/O operations.

5. The method in accordance with claim 4, further comprising the step of:

reexecuting said unfinished write I/O operations.

6. The method in accordance with claim 4, wherein said information necessary to identify redundancy groups associated with said unfinished write I/O operations includes block addresses to which said unfinished I/O operations map data and parity information.

7. In an independent access disk array subsystem employing a read-modify-write process to update data and parity information saved to redundancy groups within said array in response to a write I/O request received from a host system, a method for maintaining consistency between data and parity information saved to data and parity storage areas within said redundancy groups following a system reset which interrupts the execution of one or more disk write I/O operations, said method comprising the steps of:

examining current drive activities to identify unfinished write I/O operations in response to the receipt of a reset signal;

logging into a non-volatile memory information necessary to identify redundancy groups associated with said unfinished write I/O operations, information necessary to identify the data and parity data storage areas to which said unfinished write I/O operations map new data and parity, and some form of the old data and parity information saved to the data and parity data storage areas to which said unfinished write I/O operations map new data and parity;

checking for log entries in the non-volatile memory during a disk array subsystem initialization following the system reset;

for each one of said unfinished write I/O operations, combining the old data and parity associated therewith and saved to said non-volatile memory with the data currently stored within the data storage area to which said one of said unfinished write I/O operation maps new data to calculate parity consistent with the data stored within said redundancy group; and writing the calculated parity to said parity storage areas within said redundancy group associated with said one of said unfinished write I/O operations.

8. The method in accordance with claim 7, further comprising the step of:

reexecuting said unfinished write I/O operations.

9. The method in accordance to claim 7, wherein:

said independent access disk array subsystem is operating in a degraded mode, one of the disk drives within said array being inactive; and said unfinished write I/O operations map new data and parity information to data and parity storage areas within active disk drives in said array subsystem.

10. The method in accordance with claim 7, wherein:

the old data and parity information saved to said non-volatile memory comprises the exclusive-OR product of said old data and said old parity; and said step of calculating parity consistent with the data stored within a redundancy group comprises, for each one of said unfinished write I/O operations, the step of determining the exclusive-OR product of (1) the exclusive-OR product of said old data and said old parity associated with said one of said unfinished write I/O operations and saved to said non-volatile memory with (2) the data currently stored within the data storage area to which said one of said unfinished write I/O operation maps new data.

11. In an independent access disk array subsystem employing a read-modify-write process to update data and parity information saved to redundancy groups within said array in response to a write I/O request received from a host system, a method for maintaining consistency between data and parity information saved to data and parity storage areas within said redundancy groups following a low power condition which interrupts the execution of one or more disk write I/O operations, said method comprising the steps of:

examining current drive activities to identify unfinished write I/O operations in response to the receipt of a battery low signal from an uninterruptable power supply (UPS);

at the expiration of a predetermined time interval initiated upon receipt of said low power signal, logging into a non-volatile memory information necessary to identify redundancy groups associated with said unfinished write I/O operations, information necessary to identify the data and parity data storage areas to which said unfinished write I/O operations map new data and parity, and some form of the old data and parity information saved to the data and parity data storage areas to which said unfinished write I/O operations map new data and parity;

checking for log entries in the non-volatile memory during a disk array subsystem initialization following a recovery from said low power condition;

for each one of said unfinished write I/O operations, combining the old data and parity associated therewith and saved to said non-volatile memory with the data currently stored within the data storage area to which said one of said unfinished write I/O operation maps new data to calculate parity consistent with the data stored within said redundancy group; and writing the calculated parity to said parity storage areas within said redundancy group associated with said one of said unfinished write I/O operations.

12. The method in accordance with claim 11, further comprising the step of:

reexecuting said unfinished write I/O operations.

13. The method in accordance to claim 11, wherein:

said independent access disk array subsystem is operating in a degraded mode, one of the disk drives within said array being inactive; and said unfinished write I/O operations map new data and parity information to data and parity storage areas residing on active disk drives within said array subsystem.

14. The method in accordance with claim 11, wherein:

the old data and parity information saved to said non-volatile memory comprises the exclusive-OR product of said old data and said old parity; and said step of calculating parity consistent with the data stored within a redundancy group comprises, for each one of said unfinished write I/O operations, the step of determining the exclusive-OR product of (1) the exclusive-OR product of said old data and said old parity associated with said one of said unfinished write I/O operations and saved to said non-volatile memory with (2) the data currently stored within the data storage area to which said one of said unfinished write I/O operation maps new data.

\* \* \* \* \*